United States Patent [19]

Russ et al.

[11] Patent Number: 4,519,921

[45] Date of Patent: May 28, 1985

[54] METHODS FOR REMOVING POLLUTANTS FROM WATER AND WASTE WATER AND FOR REDUCING SLUDGE RESISTANCE TO DEWATERING

[75] Inventors: James J. Russ, Lawrenceburg; John W. Smith, Germantown, both of Tenn.; Janet S. Condra, Vicksburg, Miss.

[73] Assignee: Hydro Fuels, Inc., Wilmington, Del.

[21] Appl. No.: 523,033

[22] Filed: Aug. 11, 1983

[51] Int. Cl.³ ............................................. C02F 1/52
[52] U.S. Cl. .................................................... 210/716
[58] Field of Search ............... 210/716, 717, 751, 724; 423/127

[56] References Cited

U.S. PATENT DOCUMENTS

| 3,720,609 | 3/1973 | Smith et al. | 210/751 |
| 4,024,087 | 5/1977 | Lanier et al. | 210/716 X |
| 4,130,627 | 12/1978 | Russ et al. | 423/127 |

FOREIGN PATENT DOCUMENTS

| 1372358 | 10/1974 | United Kingdom | 210/716 |
| 2040905 | 9/1980 | United Kingdom | 210/716 |

*Primary Examiner*—Thomas Wyse
*Attorney, Agent, or Firm*—Kendrick, Netter & Bennett

[57] ABSTRACT

A method for treating water or waste water to remove pollutants therefrom includes treating fly ash comprising aluminum, iron and silica with an aqueous base, recovering a base-treated, solid fly ash, washing the base-treated solid fly ash with water, recovering a rinsed, base-treated fly ash solid, reacting the rinsed, base-treated fly ash solid with mineral acid, and recovering an aqueous, solubilized acidic fly ash leachate, then mixing the aqueous, acidic solubilized fly ash leachate with water or waste water to remove pollutants therefrom, or with sludge to reduce its resistant to dewatering.

18 Claims, No Drawings

METHODS FOR REMOVING POLLUTANTS FROM WATER AND WASTE WATER AND FOR REDUCING SLUDGE RESISTANCE TO DEWATERING

This invention relates to methods for treating water and waste water with a derivative of fly ash to remove pollutants from them, and to methods for reducing the resistance of sludge to dewatering.

Fly ash is a particulate solid produced in great quantities in the United States from the combustion of coal. Fly ash commonly contains as its principal components silica, iron and aluminum, often together with lesser amounts of other metals, sulfur and carbon. Unmodified fly ash has been used for removing pollutants from water and waste water, but has proved ineffective.

This invention provides methods for removing pollutants from water and waste water comprising treatment with aqueous acidic, solubilized fly ash. This aqueous, acidic, solubilized fly ash also reduces the resistance of sludge to dewatering when mixed therewith. To make such aqueous acidic solubilized fly ash, our method comprises treating fly ash with an aqueous base such as sodium hydroxide or potassium hydroxide at a temperature and for a time sufficient to break the physical bonds between the silica and the metals bound to the silica, and recovering from this aqueous base treatment a solid, base-washed fly ash, and an aqueous caustic wash containing some suspended aluminum, iron and silicon. The base-treated solid fly ash can then be washed with water, and filtered, by vacuum or otherwise, to obtain a substantially base-free, base-treated fly ash solid and a second aqueous caustic wash containing some suspended aluminum, iron and silica.

The base-treated, solid fly ash is then reacted with an aqueous mineral acid, such as aqueous hydrochloric acid, for a time and at a temperature sufficient to solubilize a substantial portion of the silica, iron and aluminum in the base-treated solid fly ash. The acid-treated fly ash is then filtered to recover solubilized, acidic fly ash leachate, and an unsolubilized, acidic fly ash aqueous slurry. The aqueous slurry can be washed with water and filtered for recovery of an acidic, unsolubilized fly ash residue and an acidic aqueous supernatant containing some solubilized aluminum, iron and silicon. The solubilized, aqueous acidic fly ash leachate is highly effective in coagulating and flocculating water and waste water pollutants, such as color bodies, turbidity, and solubilized solids. The leachate is also effective in reducing the chemical and biological oxygen demands of polluted waters and waste waters.

The acidic leachate, the aqueous, acid-treated fly ash solid slurry recovered as a by-product in manufacture of the leachate, and the acidic solid fly ash residue separated from this slurry by washing with water and filtering are all effective as agents for reducing the resistance of sludge to dewatering.

The quantities of the acidic, aqueous, solubilized fly ash leachate sufficient to coagulate and flocculate water and waste water pollutants varies with the quantities of aluminum, iron and silica in the leachate and with the nature and quantity of the pollutants in the water and waste water to be treated. The nature and quantity of other metals in the leachate also affect the quantities needed, particularly of such metals as calcium, which tend to increase the solubility of the leachate in water. Surprisingly small quantities of leachate are required to remove pollutants from waste water or to reduce the resistance of sludge to dewatering by comparison to the quantities of such conventional coagulants as ferric chloride and aluminum sulfate required to achieve the same results.

To prepare the leachates of this invention, the preferred embodiments of our process first treat raw fly ash with an aqueous solution containing a base such as sodium or potassium hydroxide with the concentration of the base in water in the range of about 10% to about 30% by weight and with the solution pH in the range of about 11.5 to about 13.5. The treatment takes place at a temperature in the range of about 90° C. to about 135° C. or higher for a time in the range of about 0.5 to about 2.5 hours, or for a time and at a temperature sufficient to break the physical bonding between the silica and the metals in the fly ash. Examples of this step appear in U.S. Pat. No. 4,130,627, issued Dec. 19, 1978, entitled, "Process for Recovering Mineral Values from Fly Ash."

After treatment with aqueous base is complete, the base-treated fly ash solids are separated from the aqueous caustic decant which contains some suspended aluminum, iron and silica. Solid, base-treated fly ash is then preferably washed with water, and separated by vacuum filtration or otherwise from the aqueous wash to form a base-treated, washed solid fly ash residue.

The basic, solid fly ash residue is then reacted with aqueous mineral acid for a time and at a temperature sufficient to solubilize a substantial portion of its aluminum, iron and silica. Preferably, this mineral acid treatment takes place for a time in the range of about 0.5 to about 2.5 hours, at a temperature in the range of about 70° C. to about 90° C. and at a pH in the range of about 1 to 2.5. In preferred embodiment, the acid concentration in the media is in the range of about 10% to about 20% by weight. U.S. Pat. No. 4,130,627 contains additional details of this treatment.

After mineral acid treatment is complete, the undissolved fly ash solids are separated from the solubilized fly ash solids, preferably by vacuum filtration, to form an acidic, base-treated and acid-reacted solid fly ash residue and an acidic, aqueous, fly ash leachate comprising substantial amounts of solubilized aluminum, iron and silica. This acid leachate is highly effective for coagulating and flocculating impurities in water and in waste water, and in reducing the resistance of sludge to dewatering. An acidic, solid, base-treated and acid-reacted unsolubilized fly ash slurry forms as a by-produce of leachate manufacture, and can be washed and separated into solid and liquid, preferably by vacuum filtration. The resulting acidic, unsolubilized fly ash solid residue is also effective in reducing the resistance of sludge to dewatering.

EXAMPLES

We obtained a fly ash that contains about 15.3% by weight aluminum, about 20.5% silicon by weight, and about 5.1% by weight iron, together with small amounts of such metals as strontium, manganese, titanium, calcium, potassium, magnesium and sodium and small amounts of carbon and sulfur. We treated each of five 100-gram samples of this fly ash with 800 milliliters of water containing 15% sodium hydroxide by weight for 90 minutes at 90° C., and then set the container aside to allow for gravity separation of the liquid from fly ash. We decanted the basic wash liquid, and analyzed the liquid for its aluminum, iron and silica content. We treated the solid, basic fly ash residue with water, and separated the basic fly ash solid from the resulting caustic wash liquid by vacuum filtration. Again, we analyzed both the caustic wash and the residue for aluminum, iron and silica content.

We reacted the base-treated fly ash solids with 800 milliliters of water containing 15% hydrochloric acid for 90 minutes at 90° C. We separated unreacted, now-acidic fly ash solids from the solubilized, acidic, aqueous leachate by vacuum filtration, and analyzed the leachate for its aluminum, iron and silica content. We washed the unsolubilized, acidic fly ash residue with water, and again separated liquid from solid by vacuum filtration. We analyzed the dry acidic fly ash residue and the acidic wash liquid for silica, aluminum and iron. Before subjecting the leachate to vacuum filtration, however, we recovered a quantity of acidic fly ash slurry.

On average, the aqueous caustic decant contained 486 milligrams per liter of aluminum, 7.6 milligrams per liter of iron, and 6922 milligrams per liter of silicon. The caustic wash contained 222 milligrams per liter of aluminum, 2 milligrams of iron per liter and 4374 milligrams per liter of silicon. The base-treated, washed fly ash solid contained 12.4% aluminum, 5.4% iron and 11.8% silica, with all percentages by weight. The acidic, aqueous fly ash leachate contained 8920 milligrams per liter of aluminum, 3784 milligrams per liter or iron, and 300 milligrams per liter of silica. The base-treated, acid-reacted, unsolubilized fly ash residue recovered at the end of our process contained 10.2% aluminum, 2.6% iron, and 20.4% silica, all by weight, and constituted about 78.5% of the weight of the raw fly ash.

To demonstrate the effectiveness of the acid leachate as a coagulant and flocculant for water and waste water, we first prepared a kaolin solution in water by mixing 17.5 grams of kaolin with 482.5 milliliters of deionized water at low speed for five minutes in a blender to obtain a 3.5% aqueous solution of kaolin. We also obtained water samples from the Wolf River in Tennessee, and waste water from the grit chamber of the north waste water treatment plant in Memphis, Tenn. We analyzed both the Wolf River water and the waste water for pH, color, turbidity, total suspended solids and chemical and biological oxygen demands.

We then added measured quantities of the acid leachate to five milliliters of the test water blended with 900 milliliters of deionized water. We adjusted pH as necessary, and mixed the samples at 100 rpm for five minutes. Thereafter, we mixed the samples at a slower speed for 20 minutes to simulate flocculation, then set each container aside for a 30-minute sedimentation period. We decanted the supernatant liquids from each sample, and analyzed for water quality. Sludge solids were either discarded or evaluated for dewaterability by vacuum filtration.

For comparison purposes, we ran a series of similar tests on the same water and waste water samples using well-known, commercially-accepted coagulants/flocculants, namely ferric chloride, aluminum sulfate, and mixtures of ferric chloride and aluminum sulfate. Again, we adjusted the pH as necessary. In all cases, we tested for the quantity needed to achieve a supernatant water quality of 30 milligrams per liter or less of total suspended solids (for waste water) and 10 Formazin turbidity units (for river water and for kaolin-containing water).

To demonstrate the effectiveness of the acid leachate, of the acidic fly ash slurry and of the acidic fly ash residue in reducing the resistance of sludge to dewatering, we mixed 500 milliliters of the sludge with each treating agent for three minutes at medium speed, then determined the pH and temperature of the sludge. We put 25-milliliter samples of treated sludge samples into a filter apparatus, and allowed the treated sludge to drain by gravity for two minutes. We then imposed a vacuum at 15 inches of mercury on the drained sludge samples and measured the volume of filtrate collected over seven minutes or until the vacuum broke because of cracks developing in the dried sludge. We recorded the wet and dry weights of the sludge samples after drying them in a 103° C. oven to obtain dry weight measurements. Percent sludge cake solids were calculated and recorded.

Our treatment of kaolin-containing, deionized water demonstrated that the supernatant quantity of water treated with our acid leachate was as good as or better than water treated with ferric chloride alone or aluminum sulfate alone. Using Nalco Chemical Company's, "Water Clarification Procedures," we determined that the sample equivalence, which is the ratio of the quantity of acid leachate required to reduce the turbidity of the water sample to 10 Formazin units divided by the quantity of standard required to achieve the same results, showed that the sample equivalence of our acid leachate to ferric chloride was 0.18 and, to aluminum sulfate, 0.90.

Our treatment of Wolf River water demonstrated that the acid leachate performed as well as a ferric chloride/aluminum sulfate-containing solution we prepared containing iron and aluminum in the same ratio as the acid leachate. Conventional, commercially-acceptable water and waste water coagulation/flocculation treatments do not use ferric chloride and aluminum sulfate in combination. However, our comparative results prove that our acid leachate performs as well as the prepared solutions. The only disadvantage of our acid leachate in treating the kaolin-containing water and the Wolf River water was that the acid leachate required pH adjustment, as by addition of lime. Even so, the cost of our acid leachate is far below the cost of either aluminum sulfate or ferric chloride. Moreover, our methods help with the waste disposal problems of fly ash by converting some of the fly ash to effective coagulation and flocculation agents for removing pollutants from water and waste water.

Our acid leachate produces outstanding and surprising results as a coagulant/flocculant in treatment of waste water. The sample equivalence as compared to iron and aluminum were 0.05 for iron, and 0.60 for aluminum, when we compared our acid leachate with ferric chloride and aluminum sulfate. For these tests, we chose as our target the reduction of total solubilized solids in the waste water to 30 milligrams per liter. To achieve this target, our acid leachate required 6.3 milligrams per liter of iron and 14.9 milligrams per liter of aluminum, and a pH of 5. By contrast, a ferric chloride containing solution required 115 milligrams per liter of iron at a pH of 6, and an aluminum sulfate solution required 25 milligrams per liter of aluminum at a pH of 5.4 to achieve the same results. Apparently, an unexpected synergy among the silica, aluminum and iron in our acid leachate is at least partially the reason for these outstanding results. Moreover, at comparable optimum levels of treatment, our acid leachate is just as effective as ferric chloride and aluminum sulfate in reducing turbidity, removing color bodies and in reducing the chemical oxygen demand of waste water.

Again, one apparent disadvantage of our acid leachate is the need to adjust its pH. However, the caustic decant obtained from our treatment of fly ash with aqueous base can be used for this purpose instead of lime, reducing the cost of pH adjustment.

The results of our sludge-conditioning tests were also surprising. As compared to untreated fly ash, our acid leachate was at least 33% better in reducing the resistance of sludge to dewatering. By comparison to ferric chloride alone, a commercially-acceptable sludge conditioner, our tests show that far smaller quantities of our acid leachate, after pH adjustment through addition of lime, are needed to reduce resistance of the sludge to vacuum treatment. At the optimum levels for our acid leachate and for ferric chloride, dewatering of the sludge after treatment with our acid leachate produces dried sludge containing less water than sludge treated with ferric chloride.

Our tests results are more fully explained in a thesis entitled, "Recovery of Water and Wastewater Treatment Chemicals from Fly Ash," by Janet S. Condra, published Aug. 12, 1982. We incorporate that thesis in this specification by reference.

What is claimed is:

1. A method for removing pollutants from water comprises reacting fly ash comprising silica, aluminum and iron with an aqueous base at a temperature of at least about 90° C., recovering a base-treated solid fly ash with aqueous mineral acid, and recovering an aqueous, acidic, solubilized fly ash leachate; and mixing water containing at least one pollutant selected from the group consisting of solubilized inorganic substances and suspended inorganic substances with an amount of said aqueous, acidic, solubilized fly ash leachate sufficient to reduce significantly the concentration of said pollutant in said water.

2. The method of claim 1 further comprising recovering aqueous, basic, suspended fly ash from said reacting of fly ash with aqueous base, and mixing said aqueous, basic, suspended fly ash with said aqueous, acidic, solubilized fly ash leachate to raise its pH.

3. The method of claim 2 wherein said aqueous mineral acid is aqueous hydrochloric acid.

4. The method of claim 1 further comprising recovering an acidic, solid fly ash slurry from the reaction of aqueous mineral acid with said base-treated, fly ash solid.

5. The process of claim 4 further comprising separating, and recovering an acidic, solid fly ash from said aqueous, acidic, solid fly ash slurry.

6. The method of claim 1 wherein said aqueous mineral acid is aqueous hydrochloric acid.

7. A method for removing pollutants from waste water comprises reacting fly ash comprising silica, aluminum and iron with an aqueous base at a temperature of at least about 90° C., recovering a base-treated solid fly ash, reacting said treated fly ash with aqueous mineral acid, and recovering an aqueous, acidic, solubilized fly ash leachate; and mixing waste water comprising at least one pollutant selected from the group consisting of solubilized inorganic substances and suspended inorganic substances with an amount of said aqueous, acidic, solubilized fly ash leachate sufficient to reduce significantly the concentration of said pollutant in said waste water.

8. The method of claim 7 further comprising recovering aqueous, basic, suspended fly ash from said treating of fly ash with aqueous base, and mixing said aqueous, basic, suspended fly ash with said aqueous, acidic, solubilized fly ash leachate to raise its pH.

9. The method of claim 8 wherein said aqueous mineral acid is aqueous hydrochloric acid.

10. The method of claim 7 further comprising recovering an aqueous, acidic, solid fly ash slurry from the reaction of mineral acid with said base-treated, fly ash solid.

11. The process of claim 10 further comprising separating and recovering an acidic, solid fly ash from said aqueous, acidic, solid fly ash slurry.

12. The method of claim 7 wherein said aqueous mineral acid is aqueous hydrochloric acid.

13. A method for reducing the resistance of sludge to dewatering comprises reacting fly ash comprising silica, aluminum and iron with an aqueous base at a temperature of at least about 90° C., recovering a base-treated solid fly ash, reacting said base-treated solid fly ash with aqueous mineral acid, and recovering an aqueous, acidic, solubilized fly ash leachate; and treating water-bearing sludge with an amount of said aqueous, acidic, solubilized fly ash to substantially reduce the resistance of said water-bearing sludge to dewatering.

14. The method of claim 13 further comprising recovering aqueous, basic, suspended fly ash from said treating of fly ash with aqueous base, and mixing said aqueous, basis suspended fly ash with said aqueous, acidic, solubilized fly ash leachate to raise its pH.

15. The process of claim 14 wherein said aqueous mineral acid is aqueous hydrochloric acid.

16. The method of claim 13 further comprising recovering an aqueous acidic, solid fly ash slurry from the reaction of aqueous mineral acid with said base-treated, fly ash solid.

17. The process of claim 13 further comprising separating, and recovering an aqueous, acidic, solid fly ash from said aqueous, acidic, solid fly ash slurry.

18. The method of claim 13 wherein said aqueous mineral acid is aqueous hydrochloric acid.

* * * * *